United States Patent
Fillman et al.

(10) Patent No.: US 6,938,400 B2
(45) Date of Patent: Sep. 6, 2005

(54) ELECTRIC DRIVE MOWER WITH TRAILED AUXILIARY POWER SOURCE

(75) Inventors: Alan R. Fillman, Racine, WI (US); Anthony J. Saiia, Racine, WI (US); Kirk W. Reimers, Lincoln, NE (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/797,521

(22) Filed: Mar. 10, 2004

(65) Prior Publication Data

US 2004/0168420 A1 Sep. 2, 2004

Related U.S. Application Data

(62) Division of application No. 10/268,358, filed on Oct. 10, 2002, now Pat. No. 6,729,114, which is a division of application No. 09/489,124, filed on Jan. 21, 2000, now Pat. No. 6,571,542.
(60) Provisional application No. 60/126,153, filed on Mar. 25, 1999.

(51) Int. Cl.[7] .................. A01D 34/03; A01D 34/43; A01D 34/64
(52) U.S. Cl. ...................... 56/10.6; 180/65.1
(58) Field of Search ............... 56/10.6, 6, 7; 180/65.1, 180/53.5; 280/422

(56) References Cited

U.S. PATENT DOCUMENTS

| | | |
|---|---|---|
| 1,924,462 A | 8/1933 | Scofield |
| 2,177,687 A | 10/1939 | Bracken et al. |
| 2,733,661 A | 2/1956 | Surgi |
| 2,891,677 A | 6/1959 | Ritchie |
| 2,898,542 A | 8/1959 | Wasko et al. |
| 3,732,671 A | 5/1973 | Allen et al. |
| 3,860,081 A * | 1/1975 | Moll et al. ................. 180/14.3 |
| 3,983,952 A | 10/1976 | McKee |
| 3,989,118 A | 11/1976 | Hansen |
| 4,199,037 A * | 4/1980 | White ....................... 180/65.4 |
| 4,277,737 A | 7/1981 | Muller-Werth |
| 4,306,402 A * | 12/1981 | Whimp ........................... 56/7 |
| 4,348,628 A | 9/1982 | Loucks |

(Continued)

FOREIGN PATENT DOCUMENTS

WO   WO 97/28681   *   8/1997   ..........  A01D/69/02

*Primary Examiner*—Árpád Fábián Kovács
(74) *Attorney, Agent, or Firm*—Harness, Dickey & Pierce, P.L.C.

(57) ABSTRACT

Provided is an all-electric riding greens mower. The mower includes a frame which is supported for movement upon a plurality of ground engaging wheels and upon which are supported a modularly interchangeable power source and a plurality of reel lawn mowers. An electric motor provides driving torque to enable movement of the mower between and over golf course greens or other surfaces to be mowed, electric motors provide driving torque for each of the reel lawn mowers. The interchangeable power source provides electrical energy for driving the electric motors, including the primary mover and the electrical motors for the reel type lawn mowers. The modularly interchangeable power sources may comprise a bank of batteries, a motor/generator set, a fuel cell, or a combination of these. The power source may be easily exchanged in the field for another, freshly charged power source. Exchange occurs using either a fixed change stand or a mobile change stand. The change stands are configured to facilitate exchange by reducing friction caused by the generally weighty power source. The power source is delivered to the fixed stand on towable trailers.

13 Claims, 10 Drawing Sheets

U.S. PATENT DOCUMENTS

| | | |
|---|---|---|
| D277,285 S | 1/1985 | Lopez |
| 4,584,821 A | 4/1986 | Booth |
| 4,870,811 A | 10/1989 | Steele |
| 5,098,146 A | 3/1992 | Albrecht et al. |
| 5,156,226 A | 10/1992 | Boyet et al. |
| 5,248,566 A | 9/1993 | Kumar et al. |
| 5,360,307 A | 11/1994 | Schemm et al. |
| 5,406,778 A | 4/1995 | Lamb et al. |
| 5,629,102 A | 5/1997 | Werth |
| 5,713,189 A | 2/1998 | Toman |
| 5,727,372 A | 3/1998 | Kanitz et al. |
| 5,794,422 A | 8/1998 | Reimers et al. |
| 5,839,529 A | 11/1998 | DePaoli |
| 5,934,051 A | 8/1999 | Hahn |
| 5,934,053 A | 8/1999 | Fillman et al. |
| D416,858 S | 11/1999 | Domanski |
| 6,082,084 A | 7/2000 | Reimers et al. |
| 6,269,617 B1 * | 8/2001 | Blanchard ................ 56/1 |

* cited by examiner

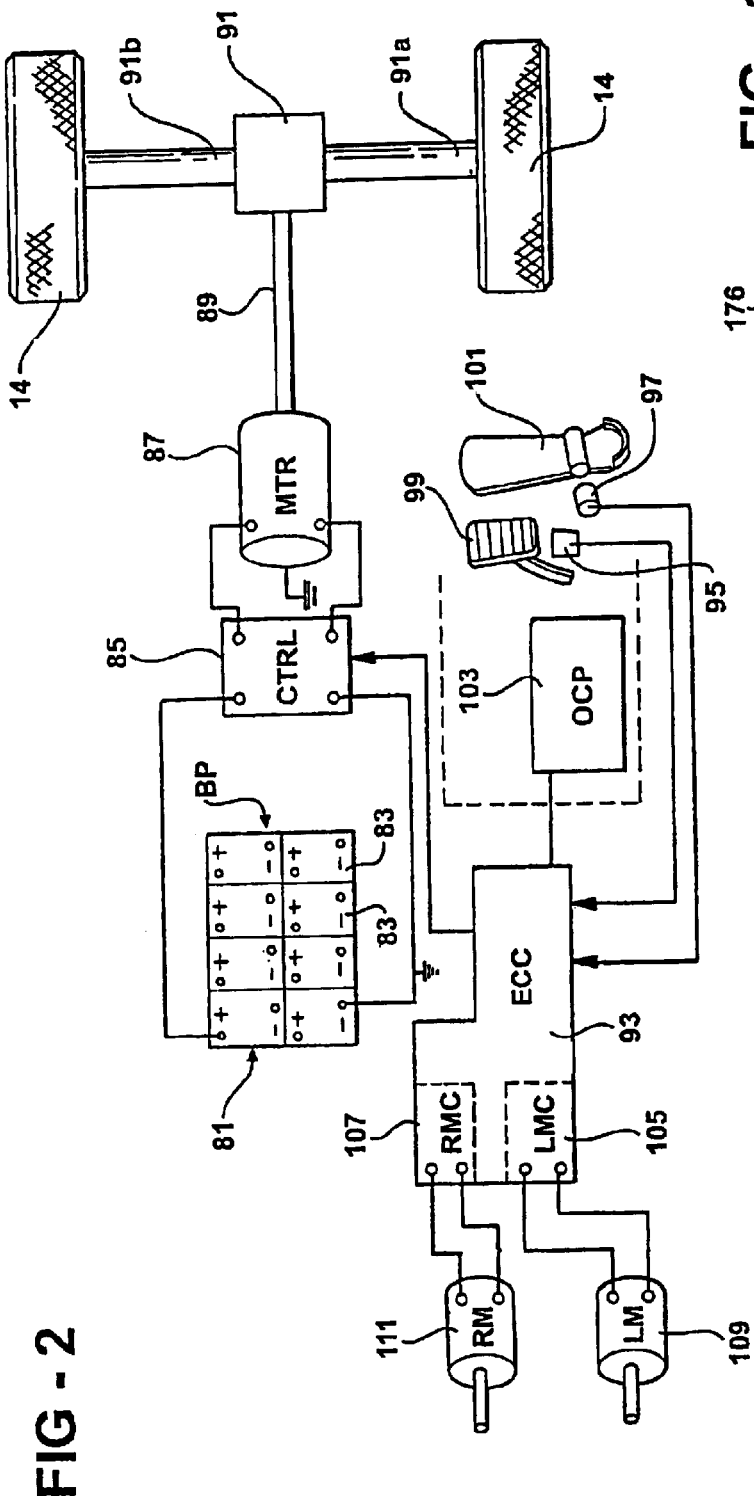
FIG - 2
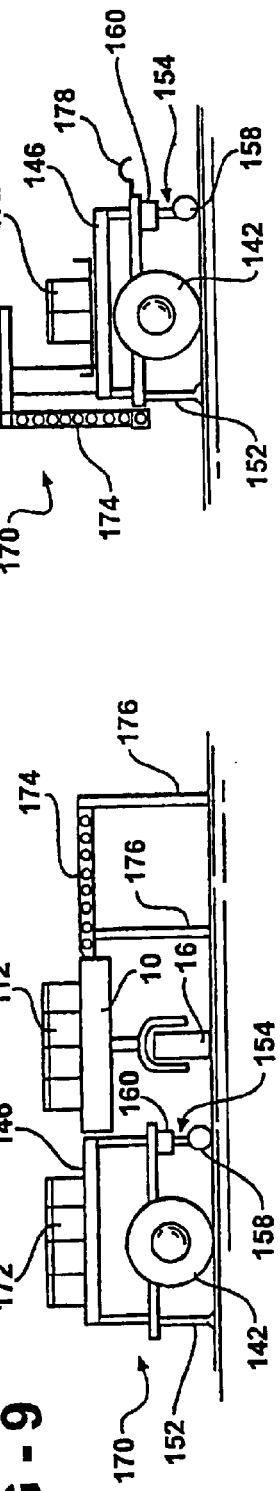
FIG - 10
FIG - 9

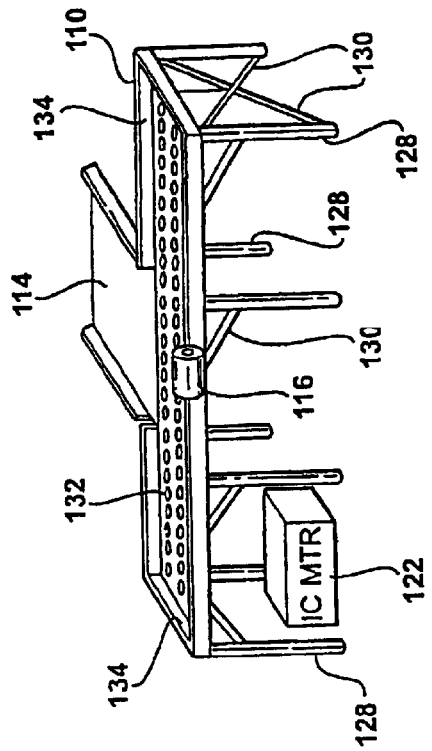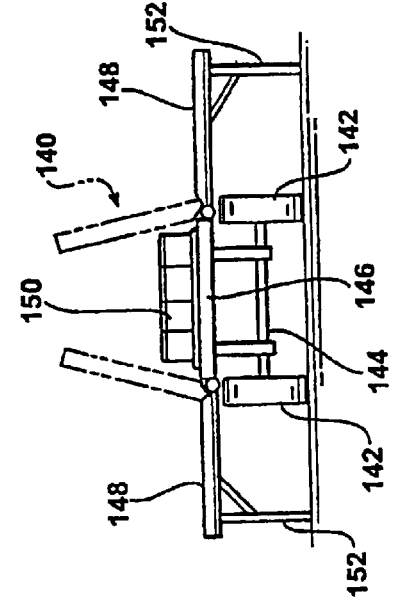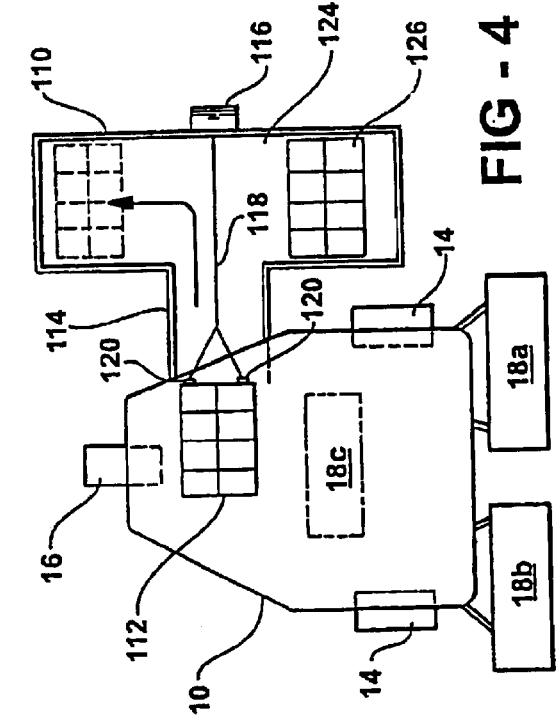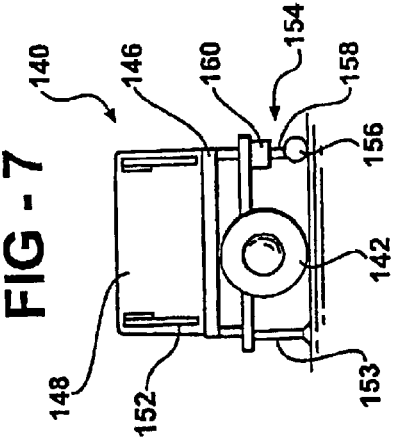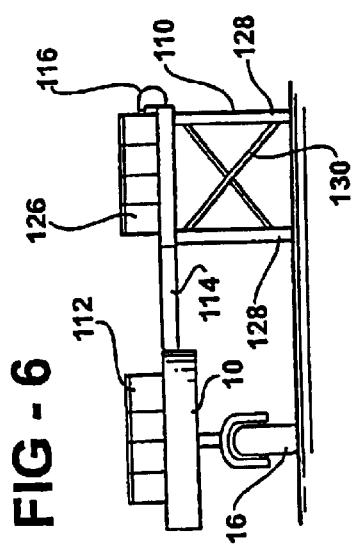

ELECTRIC DRIVE MOWER WITH TRAILED AUXILIARY POWER SOURCE

CROSS-REFERENCE TO RELATED APPLICATIONS

This application is a divisional of U.S. patent application Ser. No. 10/268,358 filed Oct. 10, 2002, now U.S. Pat. No. 6,729,114 which is a divisional of U.S. patent application Ser. No. 09/489,124 filed on Jan. 21, 2000, now U.S. Pat. No. 6,571,542 issued Jun. 3, 2003, which claims the benefit of U.S. Provisional Patent Application No. 60/126,153 filed on Mar. 25, 1999. The disclosures of the above applications are incorporated herein by reference.

FIELD OF THE INVENTION

The present invention generally relates to electrically-powered riding mowers for use on golf courses and other large grounds, and more particularly relates to electrically-powered riding mowers that utilize modular, interchangeable electrical power sources which may include a bank of batteries, a motor/generator set, a fuel cell or combination thereof, for providing electrical power to the mower.

BACKGROUND OF THE INVENTION

The assignee of the present invention recently introduced an all-electric riding greens mower. The mower of this all-electric riding greens mower is described in detail in U.S. Pat. No. 5,406,778, issued Apr. 18, 1995, the disclosure of which is hereby incorporated by reference. The triplex riding mower disclosed in this patent has a bank of batteries supported near the rear of the frame of the riding mower which provides electrical power for operating the main drive electric motor, three reel motors, and three lift motors for raising and lowering the reel type mowing heads as needed. The main motor drives a transaxle that provides a driving force to the two forward wheels of the triplex mower. The three reel mowers each directly drive one of the reels, which may be operated independently. The three lift motors individually drive a screw-type lift mechanism which raises and lowers a head much the same way that conventional hydraulically-powered single-rod cylinders do. The mower includes a foot pedal controlled by the operator which actuates a potentiometer which directs forward or reverse motion of the vehicle at any desired rate of speed, within the limits permitted by the drive motor control circuitry and by the power capabilities of the main motor and batteries. Heavy duty contactors switchably apply electrical energy to the reel motors, which are provided with the full voltage of the battery pack, which is nominally 48 volts presently obtained by eight 6-volt batteries wired in series.

There are numerous advantages to using an all-electric riding greens mower. These include very quiet operation, because there is no noisy internal combustion engine. Another advantage is the absence of hydraulic devices and accompanying hydraulic oil on the machine, which eliminates the possibility of hydraulic oil leaks. As is known, hydraulic oil leaks in conventional hydraulically-driven and hydraulically-powered turf care equipment can significantly damage a golf green or fairway if undetected by the mower operator.

Another major advantage of the all-electric greens mower is that it does not produce byproducts of combustion, and thus can operate in areas where the use of conventional internal combustion powered mowers is prohibited due to pollution concerns and regulations.

While the disclosed all-electric greens mower is quite satisfactory and much appreciated, it is difficult and impractical to mow large areas, such as fairways or parks with that style of mower, even when appropriate reel-style mowing heads are installed. The range of the battery packs carried by the present mowers remain inherently limited by the power capabilities of conventional batteries.

One challenge presently faced by many golf course operators is that municipalities and communities, especially those which have residential homes bordering the golf courses, restrict by ordinance the hours during which the fairways and greens may be mowed. Homeowners have tired of noisy mowing equipment awakening them during the early morning hours, between 5:00 a.m. and 8:00 a.m., and disturbing them in their leisure during the later evening hours, between 7:00 p.m. and 10:00 p.m., when they expect peace and quiet in their neighborhoods. Golf course operators, on the other hand, dislike mowing their courses during peak golfing times, between 7:00 a.m. and 7:00 p.m. during the golfing season. This challenge presents particular difficulties for golf course owners whose courses are continuously busy, and usually have a waiting list of people seeking tee times.

A sufficiently quiet mower, such as an all-electric mower would allow for mowing fairways and greens on golf courses even where communities have instituted noise-limiting ordinances. This is because the all-electric mowers are very quiet. Unfortunately, the battery range of a riding electric mower with one bank of batteries (even though the battery weight is in excess of 400 pounds) is limited. Battery-powered commercial mowers, therefore, remain impractical for mowing large areas due to the typically extensive recharge times required to fully recharge the battery and the undesirable need to interrupt the mowing process (which the golfers wish to have completed as expeditiously as possible) while the batteries are re-charging.

Therefore, it is a principal object of the present invention to provide an electrically-powered riding mower which is capable of mowing large areas of turf, such as golf course fairways, soccer fields, parks, and municipal grounds. A related object is to provide an all-electric riding mower which is capable of mowing large areas while producing very little noise and minimizing mowing interruptions to replace or re-charge the on-board power source.

Another object of the present invention is to provide an electrically-operated riding mower that utilizes modular, interchangeable electric power sources which may include, for example, a bank of batteries, a motor/generator set, or a fuel cell, individually or in combination, to provide electrical power to the mower. Still another object of the present invention is to provide removable, rechargeable electrical power sources on easily interchangeable trays, so that they can be quickly changed and moved about.

Yet another object of the present invention is to provide an additional electrical power source in the form of a towed power source mounted on a trailer which provides supplemental electrical energy to an all-electric battery-powered mower so that it runs longer distances.

Yet another object is to provide a preferred method for efficiently utilizing such electrically-powered riding mowers having towed power sources.

Yet another object is to provide changing structures which facilitate the removal of replaceable, rechargeable electrical power sources from turf equipment, such as the disclosed fairway mowers.

Yet another object is to provide a stacked vertical power source change rack, a horizontal power source change platform, and a towable power source change platform.

Still further objects of the present invention are set forth in and will become apparent from the following summary of the invention and the detailed description and claims thereafter.

SUMMARY OF THE INVENTION

In light of the foregoing problems and in order to fulfill one or more of the foregoing objects, there is provided, in accordance with a first aspect of the present invention, a self-propelled riding mower having a frame supported on a plurality of ground engaging wheels. The frame supports an electrical power source for supplying electrical energy to the mower and further supports a plurality of reel type lawn mowers which are movable between a raised position and a lowered position, in accordance with operation and non-operation, respectively. The reel mowers are driven by electrical motors which receive electrical power from the power source, which may be, for example, a battery pack, a motor/generator set, or a fuel cell. A prime mover having an electric motor is also supplied with electrical energy from the power source, where the prime mover is adapted to provide torque to one of the ground engaging wheels upon which the frame is supported.

There is provided in accordance with a second aspect of the present invention, a self-propelled riding mower having a frame supported on a plurality of wheels. A plurality of reel type lawn mowers are also supported by the frame and are movable between a raised, non-operative position and a lower operative position. The reel type lawn mowers are powered by electric motors which receive electrical power from the power source. A prime mover having an electric motor supplied with electrical energy from the power source provides driving torque for at least one of the ground engaging wheels. Further, the self-propelled riding mower includes support for at least a portion of the power source which engages and disengages the frame to enable removal and installation of the power source.

In a third aspect of the present invention, a self-propelled riding mower having a frame supported on a plurality of ground engaging wheels. The mower also includes a first power source and a plurality of reel type lawn mowers supported from the frame which are movable between a raised position and a lowered position. The reel type lawn mowers are driven by electric motors receiving electrical power from the power source. Further, a prime mover comprising an electric motor supplied with electrical energy from the power source is adapted to provide driving torque to at least one of the ground engaging wheels. Further yet, a power source trailer is supported on a plurality of ground engaging wheels and supports a second power source. The trailer interconnects with the frame by a hitch so that the self-propelled mower tows the trailer.

In accordance with another aspect of the present invention, a power source change stand for switching power sources between a vehicle having interchangeable power sources and an auxiliary power source platform. The power source change stand includes a first support to support the power source on the change stand and a second support to support the power source on the change stand, one of which is empty. To change the power source, one of the two supports receives the depleted power source from the mower, while other supports support a fresh power source which is then placed on to the frame of the electrically powered vehicle.

There is provided in accordance with yet another aspect of the present invention, a trailer for supplying electrical energy to a self-propelled riding mower including a frame for supporting a power source and a pair of ground engaging wheels for supporting the frame. The trailer includes a tongue extending from the frame having a hitch for interconnecting to the towing vehicle. The power source is then interconnected to the towing vehicle in order to provide electrical energy to the towing vehicle.

These and other objects, advantages and aspects of the present invention may be further understood by referring to the detailed description, accompanying Figs., and appended claims.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The drawings form an integral part of the description of the preferred embodiments and are to be read in conjunction therewith. Like reference numerals designate the same or similar components or features in the various figures, where:

FIG. 2 is a block diagram of electrical components of the mower of FIG. 1, including a controller for directing the operation of the components;

FIGS. 4 through 6 are plan, perspective, and side views, respectively, of a power source change rack according to a first aspect of the present invention in which the power sources are moved horizontally in order to be changed.

FIGS. 7 and 8 are side views showing a towable trailer for carrying replaceable power sources for providing replacement to the change rack of FIGS. 4 through 6;

FIGS. 9 and 10 show a towable trailer for providing replacement power sources for mowers having replaceable power sources;

DETAILED DESCRIPTION OF THE PREFERRED EMBODIMENTS

The present invention is directed to a riding greens mower powered directly by electric power or indirectly by electric power through a hydraulic drive system. For the purpose of providing a detailed description of the preferred embodiments of the invention, the invention is described as embodied as an electric or electrohydraulic triplex reel greens mower or a quintplex reel greens mower, each having a frame supported on at least three wheels, the defined number of reel-type lawn mowers supported from the frame member, an operator station including a seat from which an operator controls the function of the mower, and a source of electrical energy, such as on-board or towed battery packs, a motor/generator, or a fuel cell. It should be readily understood that the teachings of the present invention are not limited to the specific type of mowers described herein and can be extended to a variety of applications in the turf care industry and elsewhere.

Figure 1:
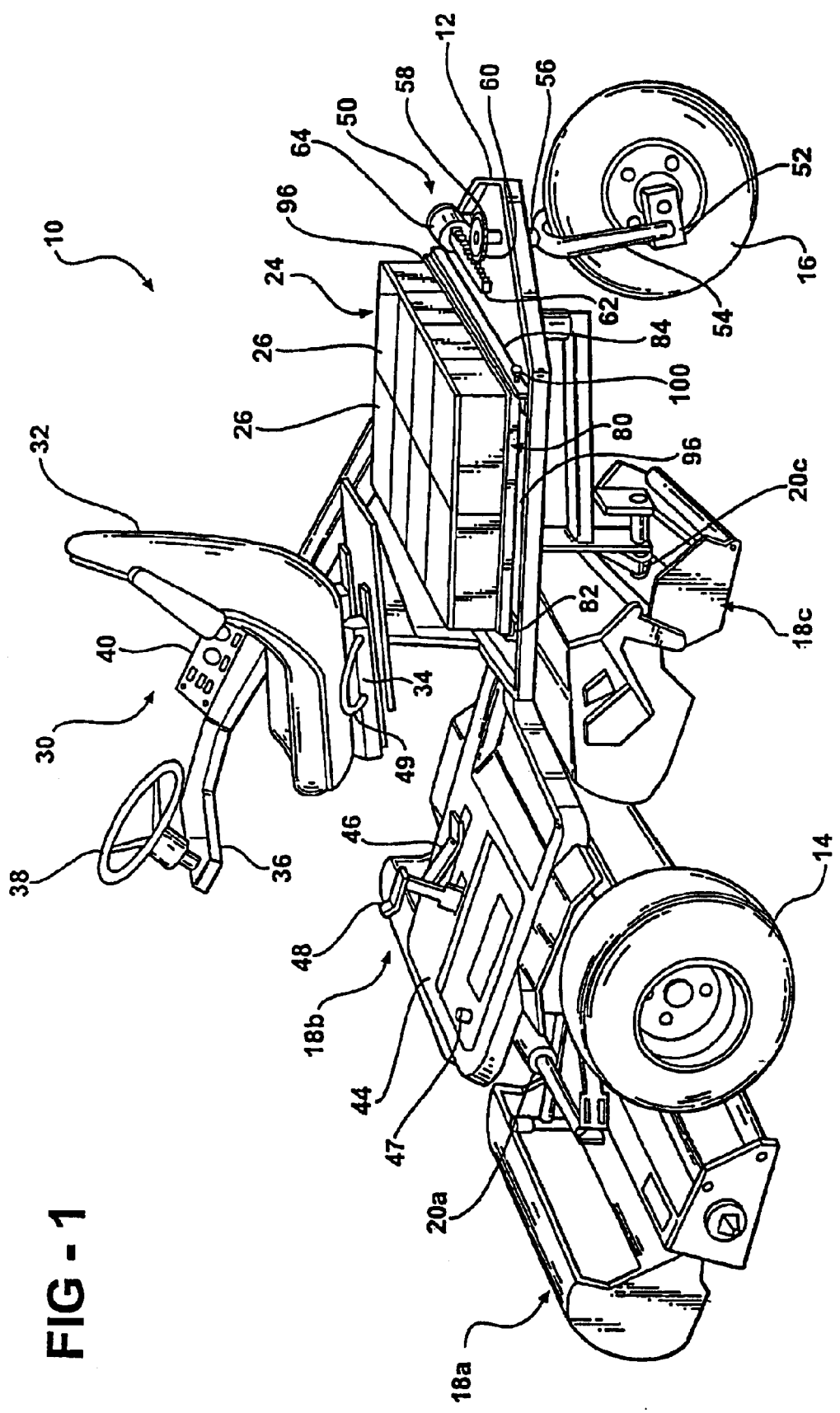
FIG. 1 is a perspective view of a three-gang mower having a replaceable power source according to first aspect of the present invention.

FIG. 1 illustrates a general arrangement of the electric turf mower 10 with an interchangeable power source 24. Mower 10 includes a frame 12 supported for movement on forward drive wheels 14 and steerable rear wheel 16. Three reel lawn mowers 18a, 18b and 18c are supported from frame 12 by reel lift assemblies 20a and 20c (the third reel lift assembly is not shown). Reel lawn mower 18a is disposed at the left forward corner of frame 12, reel lawn mower 18b is disposed at the right forward corner of frame 12, and reel lawn mower 18c is substantially disposed below frame 12. This arrangement assures that the mowers precede the ground engaging wheels such that the turf particularly on a golf green is mowed prior to being traversed by the ground engaging wheels, thereby ensuring a precise and consistent length of cut.

Each of the reel lawn mowers are driven by an electric reel motor 111 of FIG. 2, which is supplied with electrical energy from on-board power source 24. Power source 24 preferably provides between 12 volts to 96 volts of electrical energy. In one preferred embodiment, the power source 24 comprises a battery pack that includes eight six-volt lead-acid batteries 26 connected in series to provide 48 volts of electrical energy. As will be appreciated, a lower voltage may be used with smaller units while a higher voltage may be used with larger units, such a five gang fairway mower. The battery pack is replaceable and/or rechargeable, and it should be readily understood that any type of batteries, such as lead-acid or nickel cadmium (NiCad) batteries may be used with mower 10.

In another embodiment of the present invention, the electrical power source 24 may be a fuel cell. As is well-known, a fuel cell is similar to a battery in that it produces electricity as the result of a chemical reaction. Often the chemicals reacting are merely hydrogen and oxygen. Fuel cells have a significant advantage over batteries because they do not run down like batteries. In this regard, as long as fuel and oxygen are supplied to the cell, it will continue to produce electricity. Consequently, a fuel cell merely requires refueling and not recharging. U.S. Pat. No. 5,248,566 entitled, "Fuel Cell System for Transportation Applications" discloses a fuel cell propulsion system for a wheeled vehicle, the disclosure of which is hereby incorporated by reference. Such a fuel cell system may be suitably adapted for use as a power source of the present invention.

The power source 24 also provides electrical energy to a drive motor or primary mover (not shown in FIG. 1) which is adapted to provide driving torque through a driving axle (not shown in FIG. 1) to each of the forward drive wheels 14 for propelling mower 10 over the mowing surface.

Mower 10 is operated from an operator station 30, which includes a seat 32 supported above frame 12 and power source 24 by seat support 34. Operator station 30 also includes a control support arm 36 which is secured to a rearward portion of the frame 12. Control support arm 36 extends forwardly and around the seat 32 such that a steering wheel 38 is located directly in front of the operator and a control module 40 for housing control elements such as control switches and indicators is within view and reach of the operator. Located on control support arm 36 and adjacent to steering wheel 38 may be a communication panel which is operable for displaying mowing and operating instructions to the operator. Formed integral to frame 12 and associated with operator station 30 is a foot deck 44. Foot deck 44 is ergonomically angled for operator comfort and ease of reaching the drive pedal 46, brake pedal 48, and the reel mower activation switch 47. Seat 32 further may also include an assist handle 49 for assisting the operator on and off the mower 10.

Mower 10 also includes a steering mechanism 50 for rotating steerable rear wheel 16 of mower 10. Steerable rear wheel 16 is mounted to a pair of brackets 52 secured to a U-shaped yoke member 54. U-shaped yoke member 54 includes spindle 56 which is journally supported within a sleeve which is in turn secured to frame 12. Spindle 56 projects upwardly through frame 12 allowing for a steering sprocket 58 to be secured thereto. Steering sprocket 58 has a plurality of teeth 60 formed along its circumference for engaging a plurality of complimentary teeth formed in a shaft 62 projecting from steering motor 64 secured to the frame 12. Steering motor 64 enables the projection and retraction of shaft 62 which, through engagement of teeth 60 induces rotation of steering sprocket 58, thereby causes rotation of steerable rear wheel 16. Steering motor 64 may be an electrically or hydraulically actuated device which receives control commands from an electronic (or hydraulic) controller to cause projection or retraction of shaft 62. For example, steering motor 64 may be an electric motor operating a ball screw mechanism or a self-contained hydraulic cylinder integral with shaft 62.

FIG. 2 depicts a typical configuration for the electrical drive system of the mower of FIG. 1 for operating the primary mover, i.e., the main drive motor. The configuration of FIG. 2 will be described generally with equal reference to FIG. 1, but one skilled in the art will readily recognize that various other configurations may be readily adapted for operation of the turf mower. The power source is exemplified by battery pack 81, which includes a plurality of batteries 83 connected in series. Electrical energy output by battery pack 81 is input to motor controller 85. Motor controller 85 modulates the voltage from battery pack 81 to drive motor (or primary mover) 87. Motor 87 may be any of a number of motors known to those skilled in the art, including a DC, AC, or other electrically operated motor. Selection of a particular motor in part dictates selection of motor controller 87. One skilled in the art will readily recognize such design considerations. Motor 87 applies rotational motion to output shaft 89. Output shaft 89 drives a transmission 91 which converts the mechanical energy provided by output shaft 89 into torque for driving the left and right axles 91*a* and 91*b*, respectively, to cause rotation of drive wheels 14.

Motor controller 85 receives the output voltage provided by battery pack 81 and modulates the voltage input to motor 87. In this manner, motor controller 85 modulates the output of motor 87 by modulating the voltage input to motor 87. Motor controller 85 operates in conjunction with an electronic control circuit 93, which determines the desired mower speed and varies the output of motor 87 using a control signal input to motor controller 85 in order to vary the output of motor 87. Electronic control circuit 93 receives input signals through a pair of potentiometers 95 and 97 which are controlled by operator foot pedals 99 and 101, respectively. When the operator (not shown) presses operator foot pedal 99 (the brake pedal), a change in the position of potentiometer 95 results in a variation of the signal input to electronic control circuit 93. Similarly, when the operator depresses operator foot pedal 101 (the drive pedal), a change in the position of potentiometer 97 results in a variation of the signal input to electronic control circuit 93. Electronic control circuit 93 determines the desired output of motor 87 in accordance with the input signals and generates a control signal to motor controller 85. Motor controller 85 in turn varies the output voltage applied to motor 87 in accordance with the received control signal.

Electronic control circuit 93 also receives input from operator control panel 103, which is analogous to the operator control panels mentioned with respect to FIG. 1. Electronic control circuit 93 thus provides additional control for other mower control functions. For example, electronic control circuit 93 may also include a lift motor controller 105 and a reel motor controller 107 which operate lift motor 109 and reel motor 111, respectively. The electronic control circuit 93 receives input from operator control panel 103 and generates control signals input to lift motor controller 105 and reel motor controller 107. The respective controllers then generate the desired signals for carrying out the operations indicated in accordance with input from the operator control panel 103. Examples of such controlled functions include reel mower positions (raised or lowered) and reel mower speed. Lift motor 109 and reel motor 111, in addition to receiving control signals from lift motor controller 105 and reel motor controller 109, receive driving electrical energy from battery pack 81.

Figure 3:
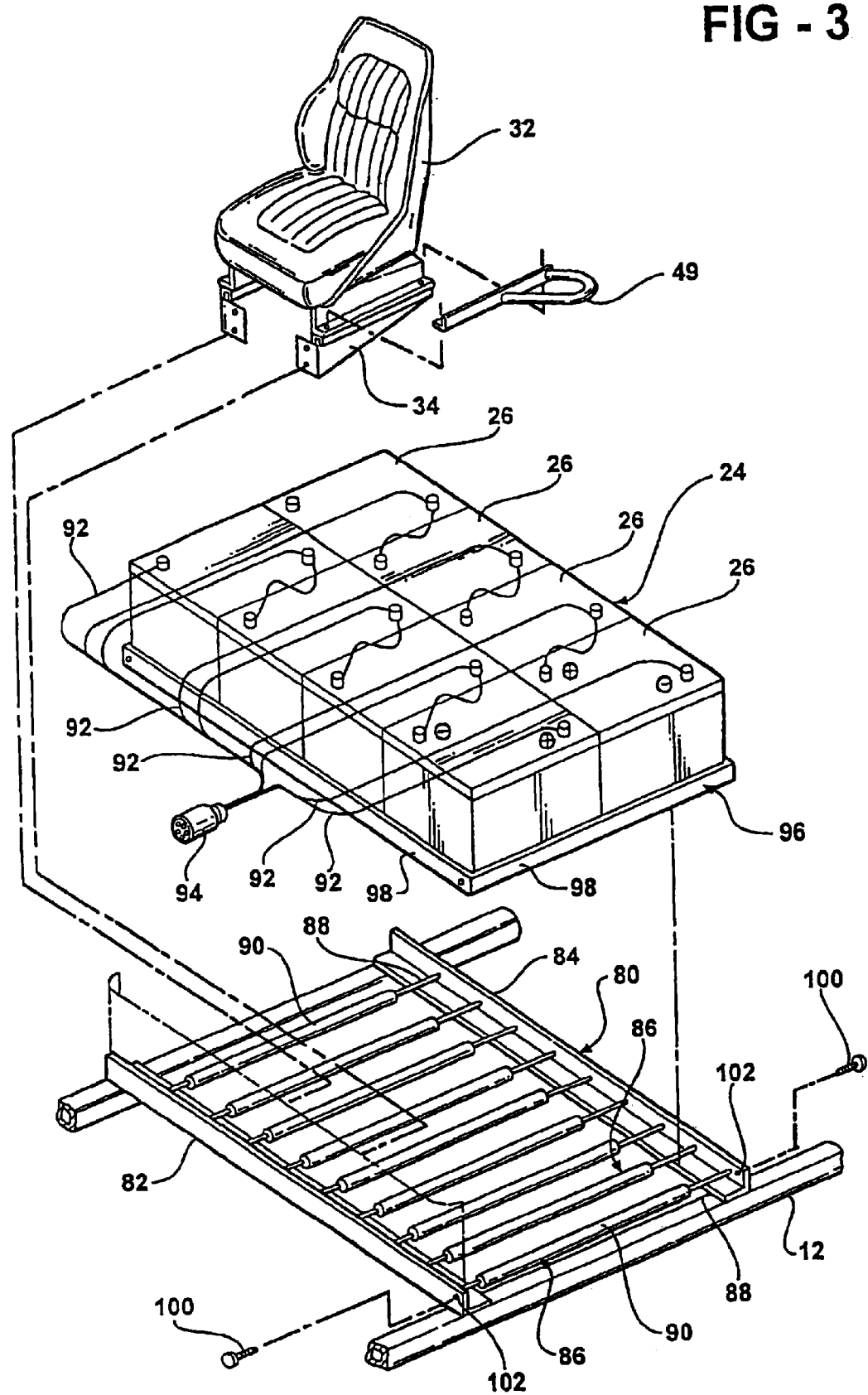
FIG. 3 is an exploded view of a replaceable battery pack and the roller platform on which the battery pack rests during operation.

With reference to FIGS. 1 and 3, a particularly advantageous feature of the present invention will be described herein. In a typical all-electric turf mower, a power source comprising a fully charged battery pack does not provide sufficient running time to complete the required mowing operations in a typical day of maintenance. Present mower configurations require two mowers to complete a single day's operation or, in the alternative, require dividing the mowing tasks over two days so that the mower can do half the task in one day—be recharged—then complete the mowing tasks on the second day. The former option proves fairly costly and inefficient, while the latter option results in incomplete maintenance of the golf course over the course of the day. It is, thus, desirable to provide a mower in which the battery pack is interchangeable to allow for use of the mower until the batteries substantially discharge followed by the changing of the battery pack to a fully-charged source to enable additional use of the mower. This process may be repeated over the course of the day so that a single mower may perform the entirety of the required operations by merely changing battery packs. One system for facilitating the removal of a battery pack in an electrically powered mower that may be utilized in conjunction with the present invention is disclosed in detail in U.S. Pat. No. 5,934,053, issued Aug. 10, 1999, the disclosure of which is hereby incorporated by reference.

FIGS. 1 and 3 depict a first embodiment of the present invention in which the power source 24 engages a guided, rolling platform to facilitate the interchange of power sources 24. Referring to FIGS. 1 and 3, a roller tray assembly 80 is mounted to the frame 12 of the mower 10. The roller tray assembly includes an angled channel 82 mounted forward of the power source 24 so that the power source 24 is seated within the angular portion of the angled channel 82. The angled channel 82 provides a forward retainer and guide for the power source 24. A second angled channel 84 is mounted rearward of the power source 24 so that the power source is seated within the angled portion of the angled channel 84. The angled channel 84 both guides and retains the power source 24, and in particular, provides a rear retainer for the power source 24. A plurality of rollers 86 connect the angled channels 82 and 84 to facilitate the interchange of the power source 24. The rollers 86 include substantially rigid rods 88 extending between the angled channels 82 and 84. The rods 88 journally support tubular rollers 90 which rotate about rods 88 and facilitate the interchange of power sources 24. Thus, the power source 24 may be easily displaced perpendicularly to the rollers 86 so that power source 24 may be removed toward either side of mower 10.

The power source 24, as described with respect to FIG. 1, may be a battery pack including a plurality of batteries 26 having positive and negative terminals. The batteries 26 are connected in series to provide a resultant battery voltage equal to the sum of the individual voltages output by each respective battery. The batteries 26 may be also tapped intermittently by conductors 92 which terminate at one connector 94. Connector 94 includes at least one output line corresponding to each particular conductor 92 so that a plurality of voltages may be provided in accordance with the selective tapping of the batteries 26. Having the conductors 92 terminate in one connector 94 expedites the interchange of the power source 24 because the operator need only disconnect one connector in order to electrically disconnect the power source 24. The power source 24 mounts within a frame 96 which includes a plurality of angled channels 98 interconnected to define the frame 96. In the alternative, the frame 96 may be embodied as a tray or may include a plurality of cross-members extending perpendicular to and joining opposite angled channels 98 to impart additional supporting structure to the frame 96.

The angled channels 82 and 84 are separated by a distance sufficient to accommodate the power source 24 and the attached frame 96, but are preferably also spaced to limit movement of the power source 24 perpendicularly to the direction of angled channels 82 and 84. Angled channels 82 and 84 include pins or keys 100 inserted in holes 102 at preferably each end of angled channels 82 and 84 to limit movement of power source 24 relative to mower 10.

FIGS. 4–6 depict plan, perspective, and side elevation views of a battery change stand 110 for interchanging the power source 24 of the mower 10. Referring to FIGS. 4–6, the operator arranges the mower 10 to be adjacent to a change stand 110. The mower 10 is arranged so that the discharged power source 112 may be moved laterally from the mower 10 onto the change stand 110. The change stand 110 is a flat, T-shaped platform. The platform includes a changing plank 114 which extends from the main portion of the changing stand toward the frame 12 of the mower 10. The discharged power source 112 may then be moved onto the change stand 110. A winch 116 having a cable extending therefrom 118 may engage the frame of the discharged power source 112 at two attachment points 120. Operation of the winch then pulls the depleted power source 112 onto the change stand 110. The winch may be electrically, mechanically, or electrohydraulically operated by a system receiving power from an internal combustion motor 122 or even from what power may remain in the depleted power source 112. Once the depleted power source 112 is displaced to the main portion 124 of change stand 110, the depleted power source 112 is moved away from the changing plank 114 so that a fully energized power source 126 may be moved to replace the depleted power source 112 on the mower 10, thus effecting a replacement of the depleted power source 112 with a fully energized power source 126.

The change stand 110 is preferably a rigid structure having a plurality of supporting legs 128 having sufficient strength to support the weight of at least two power sources. A plurality of cross-members 130 preferably provide additional rigidity to the overall structure of the change stand 110. The change stand 110 also includes a top surface 132 preferably formed of a material to facilitate sliding a power source and its supporting frame over the top surface 132 of the change stand 110. The top surface 132 may also optionally include rollers or inverted casters to further facilitate manipulation of the power sources. Change stand 110 also preferably includes a side guard 134 which maintains the power sources within the top surface 132 of change stand 110.

In order to replace a depleted power source 112 with a fully energized power source 126, the grounds maintenance crew must first deliver a power source to the change stand 110. A towable trailer 140 provides a vehicle to deliver the energized power source 126 to the change stand 110. FIGS. 7 and 8 depict one embodiment of a towable trailer 140 for dispensing a power source at the change stand 110. The towable trailer 140 includes a pair of wheels 142 arranged for rotatable motion about an axle 144. Axle 144 supports a platform 146 on which a charged power source 150 rests. A pair of leafs 148 hingedly mount to the platform 146 and hinge upwardly (shown in phantom in FIG. 8) for transporting the towable trailer 140. Leafs 148 also hinged downwardly into a substantially horizontal position (shown in FIG. 8) to enable transfer of power source 150 between the change stand 110 (of FIG. 4–6) and the trailer platform 146. In the down position, a pair of support legs 152 fold downwardly to provide outboard support for leafs 148. Towable trailer 140 also includes a rear support 153 and a forward support 154. Both rear and forward supports 153 and 154, respectively, may be raised and lowered by the operator in accordance with a particular operation. For example, during transfer of power sources between the towable trailer 140 and change stand 110, supports 153 and 154 are typically lowered to provide additional stability to towable trailer 140. During transport, rear support 153 and forward support 154 are typically raised to facilitate transportation of towable trailer 140. Forward support 154 may be of the screw-jack type mechanism typically employed on trailer vehicles. The screw-type jack device includes a caster-type front wheel 156 which is mounted to a partially threaded shaft 158. Partially threaded shaft 158 engages corresponding threads of a fixed, threaded mounting 160. Rotation of partially threaded shaft 158 thereby causes translation of the shaft through threaded mounting 160 to raise and lower the caster-type front wheel 156.

In operation, the towable trailer 140 is aligned so that when the leafs 148 are placed in a lowered position, they substantially align with changing plank 114. After the leafs 148 are lowered, the power source 150 may then be moved to the change stand 110. Once on the change stand 110, the power source 150, the operator positions energized power source 150, the depleted power source on change stand 110 may then be transferred onto towable trailer 140. Thus, the energized power source may be exchanged with the depleted power source so that the depleted power source may be returned to a specific location for replenishing.

It will be understood by one skilled in the art that various modifications of towable trailer 140 may be made. For example, towable trailer 140 need not include leafs 148. Transfer may be effected by aligning, for example, the rear end of towable trailer 140 with the changing plank 114 and switchably changing power sources off the rear of towable trailer 140. Further, it will be understood by one skilled in the art that towable trailer 140 may also function as a mobile change stand. That is, towable trailer 140 may be disposed in various locations where stationary change stand 110 would otherwise be disposed. Leafs 148 may then be lowered to a downward position and may function similarly to the top surface 132 of change stand 110. In this particular embodiment, the plank may be adapted for storage on the towable trailer 140 during transportation and attached to the rear portion of towable trailer 140 when the trailer is placed in position for power source interchange.

In a second embodiment of a trailer adapted for direct interchange, FIGS. 9 and 10 depict a trailer 170 for direct exchange of a discharged power source 112 with a charged power source 172. Note that like reference numerals from FIGS. 7 and 8 will be used to reference similar elements in FIGS. 9 and 10. FIG. 9 depicts a rear view of the mower 10 with the trailer 170 arranged to the left side of the mower and supporting a charged power source 172 for replacing the discharged power source 112. In operation, a temporary stand 174 is erected on a side of the mower 10 opposite the trailer 170. Temporary stand 174 includes a pair of legs 176 which support the combined weight of the stand 174 and the power source disposed thereon. The discharged power source 112 is removed from the mower 10 by sliding it toward the right of the mower onto temporary stand 174. Once discharged power source 112 has been positioned on temporary stand 174, charged power source 172 may then be moved from the trailer 170 onto the mower 10. The trailer 170 is then positioned adjacent temporary stand 174 which supports discharged power source 112. The discharged power source 112 is then transferred from the temporary stand 174 onto the trailer 170.

FIG. 10 depicts the trailer 170 having mounted thereon a charged power source 172 and the temporary stand 174. The temporary stand 174 is mounted towards the rear of the trailer 170 to facilitate transportation of the trailer 170. Also shown in FIG. 10 is a ball hitch. The hitch portion 178 of a ball hitch engages a ball affixed to a towing vehicle for transporting the trailer 170. It will be understood by one skilled in the art that the stationary and trailerable stands and trailers depicted in FIGS. 4–10 have several features, many of which may be interchangeable to vary the particular configuration in accordance with the specific needs of the user. For example, the stand depicted in FIGS. 4–6 may be adapted for implementation on a trailer, as discussed with respect to FIGS. 7 and 8. In this manner, the stand need not necessarily be fixed to achieve the same functionality, which provides the golf course operator flexibility in placing the change stands to maximize the use of the interchangeable power sources.

Figure 11:
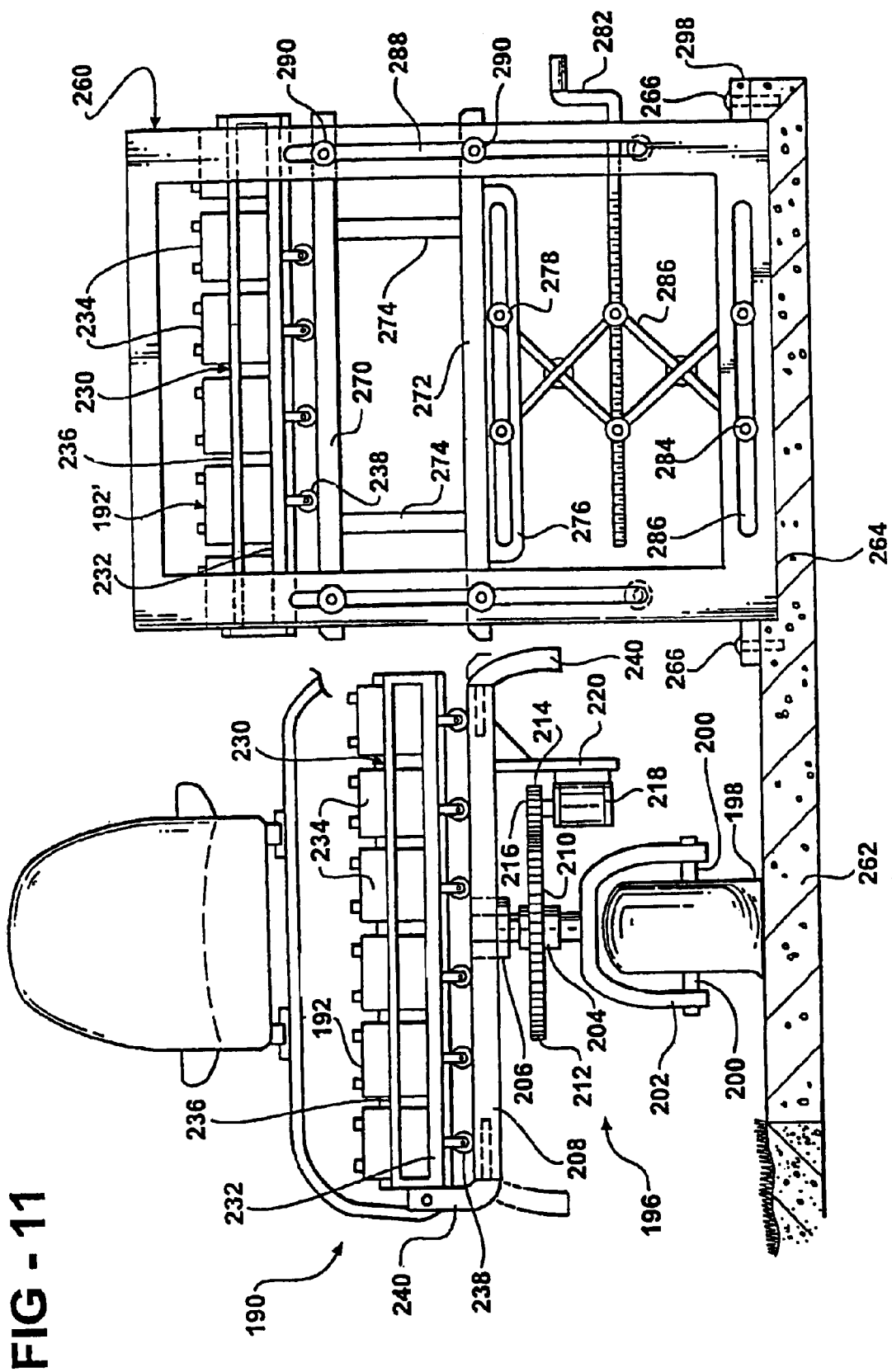
FIG. 11 is a rear elevational view showing a three-wheel electrically-driven mower having a replaceable power source and showing a stationary stand for allowing a discharged, removable power source to be replaced by a freshly charged power source.

FIG. 11 depicts yet another embodiment of a turf mower 190 having an interchangeable power source, such as battery pack 192. The mower 190 also includes an alternative configuration for the steering mechanism 196 for rotating steerable rear wheel 198 of mower 190. Steerable rear wheel 198 is mounted to a pair of brackets 200 secured to a U-shaped yoke member 202. U-shaped yoke member 202 includes a spindle 204 journally supported within a sleeve 206 secured to the frame 208. The spindle 204 projects through a steering sprocket 210. Steering sprocket 210 has a plurality of teeth 212 formed along its circumference for engaging a plurality of complimentary teeth 214 formed in an input gear 216. The input gear 216 is driven by a motor 218 which is attached to a downwardly extending motor support 220 which extends from the frame 208. Locating the steering mechanism 196 entirely beneath the frame 208 provides an added advantage through reducing the size of the rear portion of the mower 190.

The battery pack 192 is disposed within a rack 230. The rack 230 has a lower platform 232 which supports the individual batteries 234. An upper rail 236 of the rack 230 provides upper stability to the individual batteries 234 of the battery pack 192. Disposed beneath the lower platform 232 are a plurality of rollers 238 attached to the lower platform 232. The rollers 238 facilitate movement of the battery pack 192 over the top surface of frame 208. Further, the mower 190 includes on either side of the frame 208, where the battery pack 192 is located, gates 240 which retained the battery pack 192 laterally on the mower 190. The gates 240 may be lowered to enable the transfer of a battery pack onto and off of the mower 190.

FIG. 11 also depicts the battery change rack 260 which enable the interchange of battery packs onto and off of mower 190. Battery change rack 260 preferably rests on a substantially stable foundation 262, such as cement or concrete. Also, the foundation 262 supporting battery change rack 260 is also preferably of a size sufficient to accommodate the mower 190 during a battery change. Foundation 262 also preferably includes a recessed portion 264 which receives the battery change rack 260. The battery change rack 260 is then secured to the foundation 262 using fasteners 266 which project through tabs 268 located on the sides of battery change rack 260. Battery change rack 260 includes a pair of shelves 270 and 272 which received the battery packs (as shown with battery pack 192' on shelf 270). The shelves are rigidly connected with vertical members 274 which provide sufficient separation between upper shelf 270 and lower shelf 272 to accommodate a battery pack 192. An upper horizontal track 276 attaches to the lower portion of lower shelf 272. Upper horizontal track 276 accommodates a pair of rollers 278 which define the upper portion of a scissor jack 280 and enables translation of the rollers 278 within the horizontal track 276 in accordance with the raising and lowering of scissor jack 280. Thus, turning of the crank 282 results in the corresponding raising or lowering of the upper shelf 270 and lower shelf 272 of battery change rack 260.

The lower portion of scissor jack 280 includes a pair of rollers 284 which translate within lower horizontal track 286. Similarly, a pair of vertical tracks 288 accommodate rollers 290 which translate within the track 288. The rollers 290 are attached to the upper shelf 270 and lower shelf 272 so that the upper and lower shelves remain horizontally stable during the raising and lowering operation.

In operation, the operator positions the mower 190 adjacent to the battery change rack 260. One of the upper shelf 270 or lower shelf 272 preferably does not contain a battery pack. The empty shelf is then positioned in substantial vertical alignment with the upper surface of battery frame 208. The operator then transfers the battery pack 192 from the mower 190 onto the empty shelf (272 as shown in FIG. 11). The operator then turns the crank 282 to align the charged battery pack 192' with the top surface of the frame 208. Once the frame and the top shelf 270 are vertically aligned, the operator then moves the battery pack 192' onto the battery frame 208 to complete the interchange of a discharged battery pack 192 with a charged battery pack 192'. It will be understood by one skilled in the art that various modifications of the present invention may be implemented in the embodiment of FIG. 11. For example, scissor jack 280 may be any of a number of devices which mechanically assist in the raising and lowering of the battery packs, including various electric, hydraulic, and other mechanical devices. Further, the roller structure for the battery frame may be any of a number of known friction reducing devices which facilitate moving the battery packs.

Figure 12:
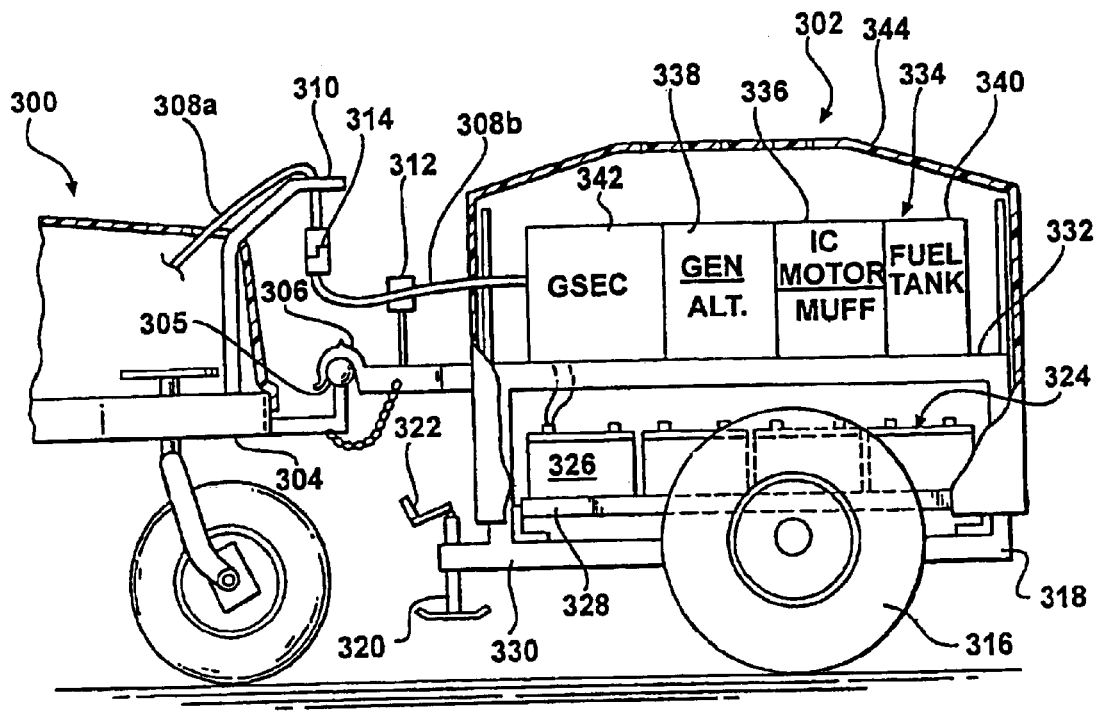
FIGS. 12 and 13 show a side elevational view and a perspective view, respectively, of a trailerable buggy of the present invention for transporting a power source, such as a battery, and a motor/generator set as sources of electrical energy.

FIG. 12 depicts yet another embodiment of the present invention in which a turf mower 300 is adapted to tow a trailer 302 which provides the electrical energy for driving the mower 300. The mower 300 is substantially similar to the mowers described with respect to FIGS. 1–11 but further includes a tow bar 304 having a ball 305 adapted to engage a hitch 306 attached to trailer 302. An electrical conductor 308 provides an electrical connection between the mower 300 and the trailer 302. The conductors 308a and 308b pass through anchors 310 and 312 to maintain the conductors 308a and 308b in a substantially fixed position. Such routing enables movement between the mower 300 and the trailer 302 while limiting flexing of the electrical conductors 308a and 308b. A connector 314 joins conductors 308a and 308b and enables for quick interconnection between conductors 308a and 308b so that the trailer may be easily separated from the mower 300.

In a first configuration of the present embodiment, the trailer 302 includes a pair of wheels 316 supporting the main platform 318. A screw jack 320 having a crank handle 322 may be operated to support the trailer 302 when disengaged from the mower 300. Following engagement of the tow bar 304 with the hitch 306, the screw jack 320 may be raised to lower the hitch 306 onto the ball 305 to enable transport of the trailer 302. A battery pack 324 includes a plurality of batteries 326 housed in a frame 328 which rests on main platform 318. The batteries may be interchanged using one of the methods described herein. The battery pack 324 is placed on a lower shelf 330 of main platform 318. A motor/generator set 334 rests upon the top shelf 332 of the trailer 302. The motor/generator set 334 includes an internal combustion motor 336 which provides mechanical input to one of a motor or generator 338 converts the mechanical input energy into electrical energy to drive the mower 300. The internal combustion motor 336 receives fuel from a fuel source such as a fuel tank 340 and preferably includes a muffler to abate noise generated by the internal combustion motor 336. The motor/generator set 334 also includes a gel cell 342 to provide electrical input for starting the internal combustion motor 336. The motor/generator set 334 operates in conjunction with battery pack 324 to provide driving electrical energy to the mower 300. Further, the motor/generator set 334 preferably provides sufficient electrical energy to charge battery pack 324 when the electrical output of the battery pack 324 drops below a predetermined level.

In another embodiment of the present invention, a second battery pack 324 may substitute for the motor/generator set 334 on the top shelf 332 of the trailer 302. A dual battery pack configuration has particular appeal when operating in golf courses in residential areas which require extremely low noise levels. Thus, the all electric mower 300 driven by dual battery packs 324 presents a particularly quiet option for operation of the mower 300. The trailer 302 may also include a vented cover 344 to prevent dirt, moisture, and other debris from entering the interior of the trailer 302.

In yet another embodiment, the ball 305 and the hitch 306 also connect electrically to indicate a positive connection therebetween. In this manner, the ball 305 and hitch 306 cooperate so that a good mechanical connection must be established prior to establishment of an electrical connection. The electrical connection may then be checked prior to enabling operation of the mower 300. This provides an electrical interlock mechanism to allow for safe operation of the mower.

Figure 13:
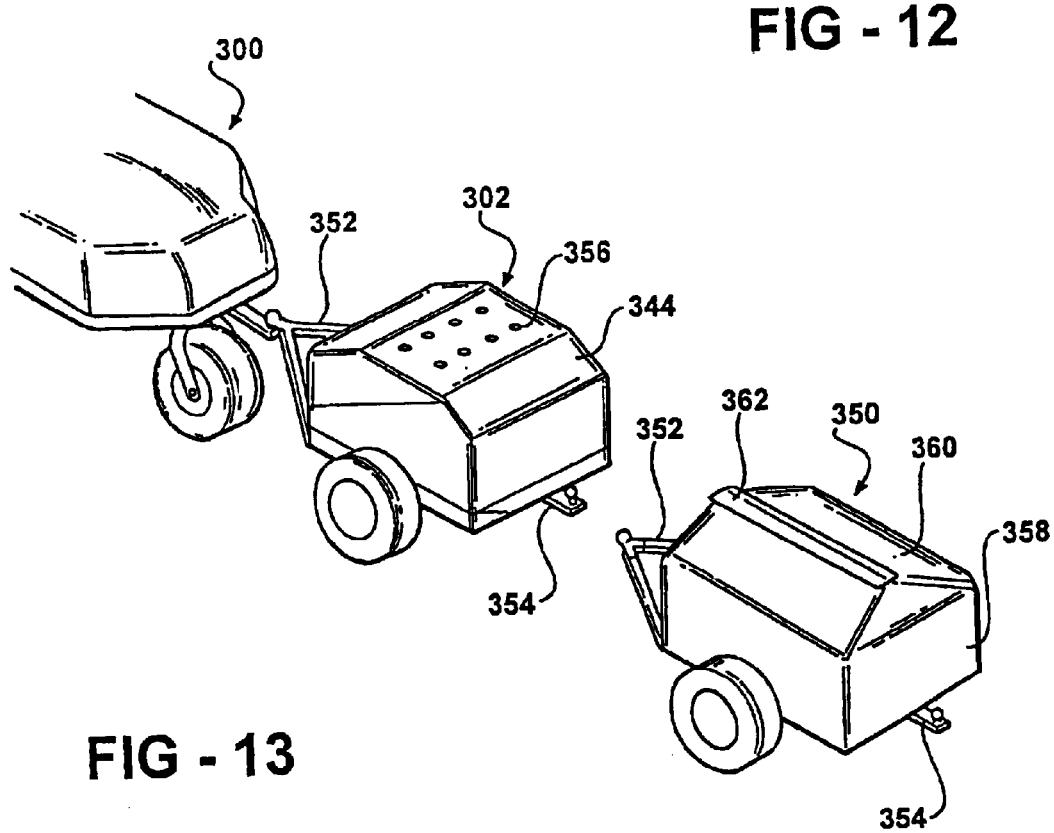

FIG. 13 depicts the mower 300 of FIG. 12 towing the trailer 302 of FIG. 12. In yet another embodiment of the present invention, a second trailer 350 which may be configured in accordance with either of the embodiments described with respect to FIG. 12. Multiple trailers could be joined to further increase the store of electrical energy potential of the mower 300. Each trailer must include a forward hitch 352 and a rear tow bar 354 for attachment to the forward hitch 352 of the following trailer. FIG. 13 also depicts two alternative configurations for the covers of the trailers 302 and 350. Trailer 302 includes a vented cover 344 having perforations 356 in the top surface of the vented cover 344. Trailer 350, on the other hand depicts a cover 358 having a peaked roof 360 and a vent 362 extending along the peak.

In still another embodiment of the present invention, a motor/generator set similar to that shown at 334 in FIG. 12 may be modularly interchangeable with power source 24 as shown in the mower 10 of FIG. 1. Interchange of these electrical supply components may be accomplished using any of the methods as described herein.

It should be noted by one skilled in the art that the trailers of FIGS. 7–10 may be adapted to operate in multiple trailer configurations as described above so that an individual towing vehicle can dispense a plurality of battery packs or be deposited at predetermined locations throughout the course for interchange with discharged batteries from the mowers.

Figure 14:
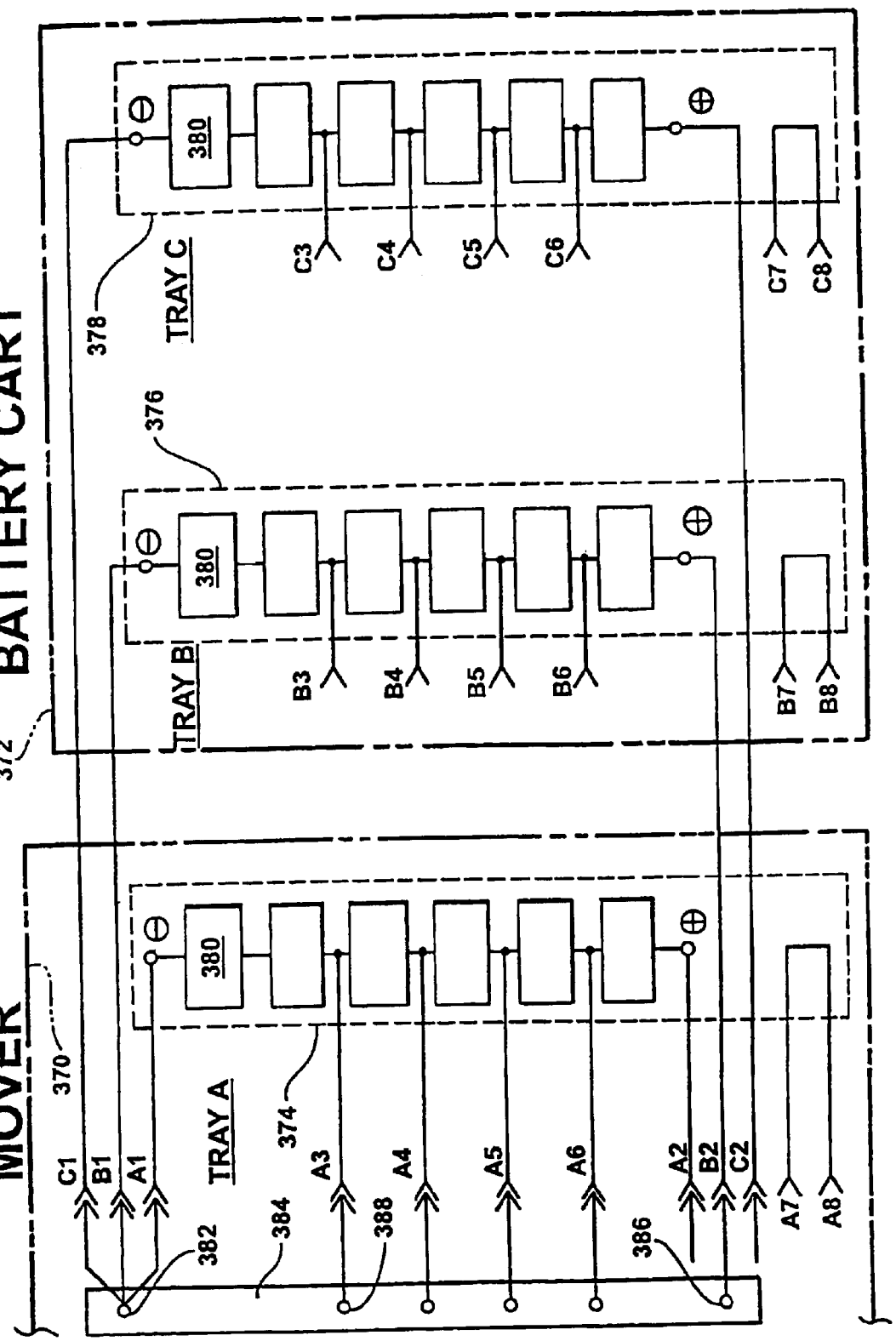
FIG. 14 shows an electrical circuit diagram for a series-parallel combination of three battery packs, one of which is on the mower and two of which are towed on a trailer.

FIG. 14 depicts a wiring schematic for providing electrical energy to a mower 370 from a battery cart 372 having a first battery pack 376 and a second battery pack 374. In addition, mower 370 also includes a battery pack 378. A plurality of battery taps A1, B1, and C1 connect to the negative terminals of batteries 374, 376 and 378, respectively. Similarly, a plurality of battery taps A2, B2, and C2 connect to the positive terminals of battery packs 374, 376, and 378, respectively. Battery taps A1, B1, and C1 terminate at the end opposite the negative terminal at an output pin 382 of a connector 384. Similarly, the end opposite the positive terminals of taps A2, B2, and C2 terminate at an output pin 386 of connector 384. Intermediate voltages between the negative and positive terminals may also be obtained by providing a battery tap between intermediate batteries 380 of the respective battery packs 374, 376, and 378. For example, assuming that each battery outputs 8 volts, battery taps A4, B4, and C4 connect so as to provide a 24 volt potential between taps A4, B4, and C4 and taps A1, B1, and C1, respectively. The battery taps A4, B4, and C4 terminate at the output pin 388 of connector 384. Other intermediate output voltages may be similarly obtained using battery taps A4-6, B4-6, and C4-6.

Each battery tray 374, 376, and 378 includes a single conductor having two terminal connections A7 and A8 and B7 and B8 and C7 and C8, respectively. The single conductors enable the controller to verify a positive electrical connection between connector 384 and a mating connector. By verifying a current flow or voltage potential across each connector pair A7 and A8, A7 and A8, and A7 and A8, the system can verify an electrical connection between connector 384 and a mating connector to help ensure safe operation of the vehicle. It should be noted that while the embodiment of FIG. 14 is primarily directed to a configuration similar to FIG. 12 wherein two battery packs are provided on the battery trailer, such interconnection method may be equally applicable to the above-discussed embodiments depicting a mower carrying a single interchangeable battery.

In operation, when mowing around the golf course, and in particular the fairways, a towed battery trailer arrangement as described in FIGS. 7–13 enables disbursement of the replacement battery packs about predetermined battery drop sites. The operation to be described herein refers particularly to the embodiment of FIG. 12 (with battery packs in each trailer). The operation generally begins with disbursing the replacement battery packs at predetermined battery drop sites. Prior to disbursing the replacement battery packs at the predetermined drop sites, the operator first attaches to the mower, or a suitable towing vehicle, as will be understood by one skilled in the art, a predetermined number of towable battery trailers. The operator engages the first trailer to the battery hitch provided at the rear of the electric mower or suitable towable vehicle. To the rear of the first battery trailer, a second towable battery trailer having additional replacement battery packs is attached to the rear of the first trailer by means of a hitch. Of course, it will be understood by one skilled in the art that this arrangement may be further repeated in accordance with the number of trailers to be dispatched to predetermined drop sites about the golf course.

Figure 15:
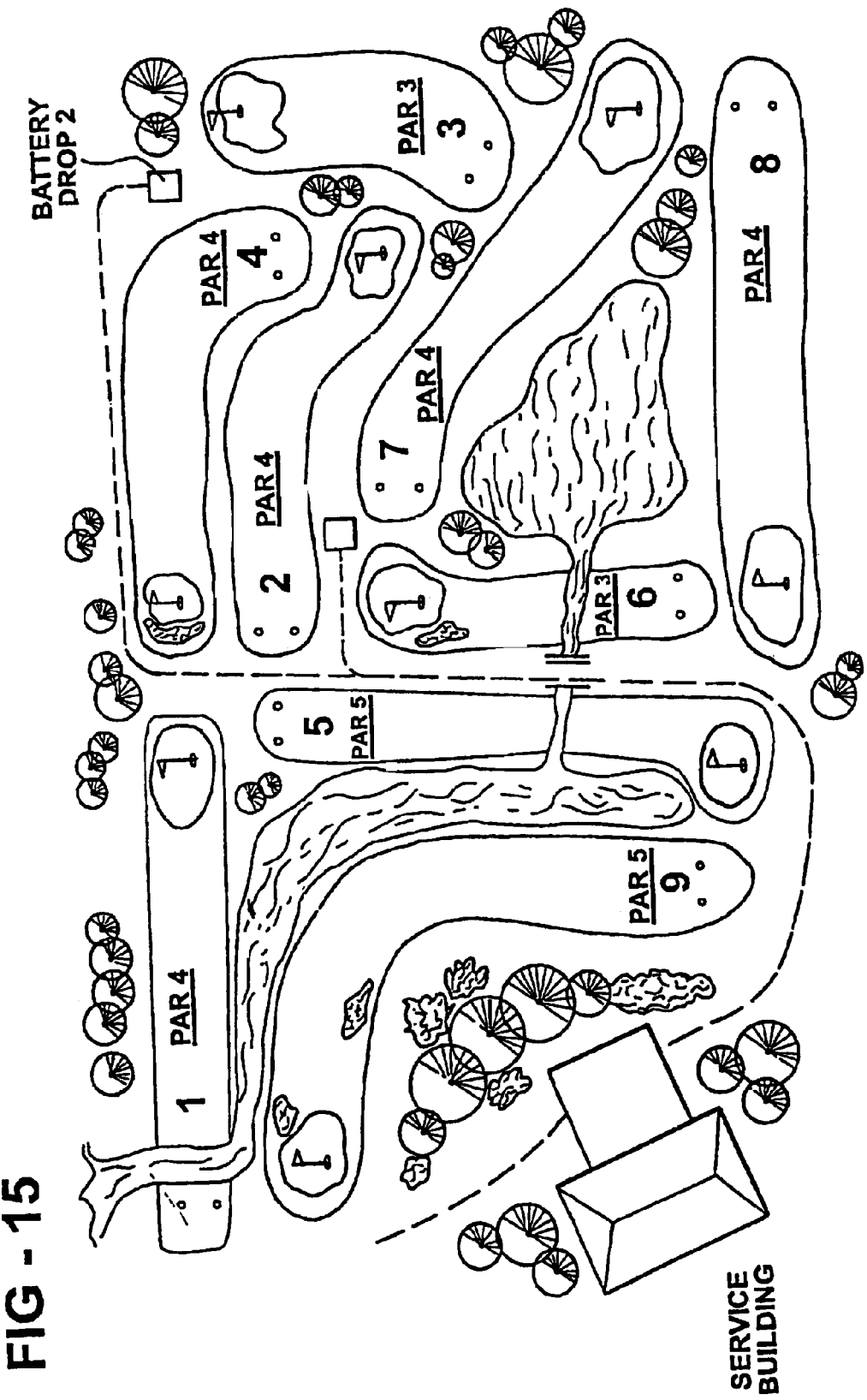
FIG. 15 shows an exemplary 9-hole golf course to illustrate the method of the present invention in strategically placing fresh battery packs around the golf course so that discharged battery packs may be disconnected from an electrically-driven mower and replaced with fresh battery packs.

Referring the FIG. 15, which depicts an exemplary layout of a nine hole golf course, the operator departs the service building and proceeds around a predetermined path, indicated by the dotted line of FIG. 15, to disburse a first replacement battery at battery drop site one near the tee area of the seventh hole. At battery drop site one, the operator disengages the second towed trailer and lowers the front pad or wheel to provide a third supporting member to supplement the support provided by the ground engaging wheels. The operator next proceeds along the predetermined path, as indicated by the dotted lines, to battery drop site two, near the pin area of the third hole. Similarly as occurred at battery drop site two, the operator disengages the towable trailer at battery drop site two and lowers the third support member, which again may be either a support pad or a lockable wheel, to provide a third support member for the towable trailer disposed at battery drop site two. After dispatching the replacement battery packs at drop site two, the operator then proceeds to mow the fairways in the specified order of the first, second, and third holes.

Following the completion of mowing at the third hole, the operator proceeds to battery drop site two where the battery pack on the mower, which is in a discharged state, is replaced with a fresh, fully charged battery pack from the trailer dispatch to battery drop site two. Upon replacement of the discharged battery with a fully charged battery pack, the operator then proceeds to mow fairways four, five, and six. After mowing the sixth fairway, the operator proceeds to battery drop site one where the battery pack installed at battery drop site two, which will now be in a discharged state, is replaced with a fully charged battery pack found at battery drop site one. The operator then proceeds to mow the fairways of the seventh, eighth, and ninth holes. After completion of the ninth hole, the operator then proceeds to the service building.

Alternatively, after completion of mowing the ninth hole, the operator may then proceed along the predetermined path, indicated by a dotted line, to battery drop site two where the towable trailer found at battery drop site two is attached to the trailer hitch found at the rear of the mower. The operator then proceeds to move the mower and the attached battery trailer to battery drop site one where the trailer found at battery drop site one is hitched to the trailer hitch found at the rear of the towable trailer hitch to the fairway mower at battery drop site one. The operator then tows both towable battery trailers back to the service building where all three battery packs, which are in a currently discharged state, can be recharged in anticipation of the next day's operation. Of course, it will be understood by one skilled in the art that the following procedure may vary in accordance with the mowing to occur, the discharge rate of the batteries, the number of holes on the golf course, and the length of the holes on the golf course, as well as several other factors. The above description is primarily an exemplary description of one particular implementation of the above-described operation.

Figure 16:
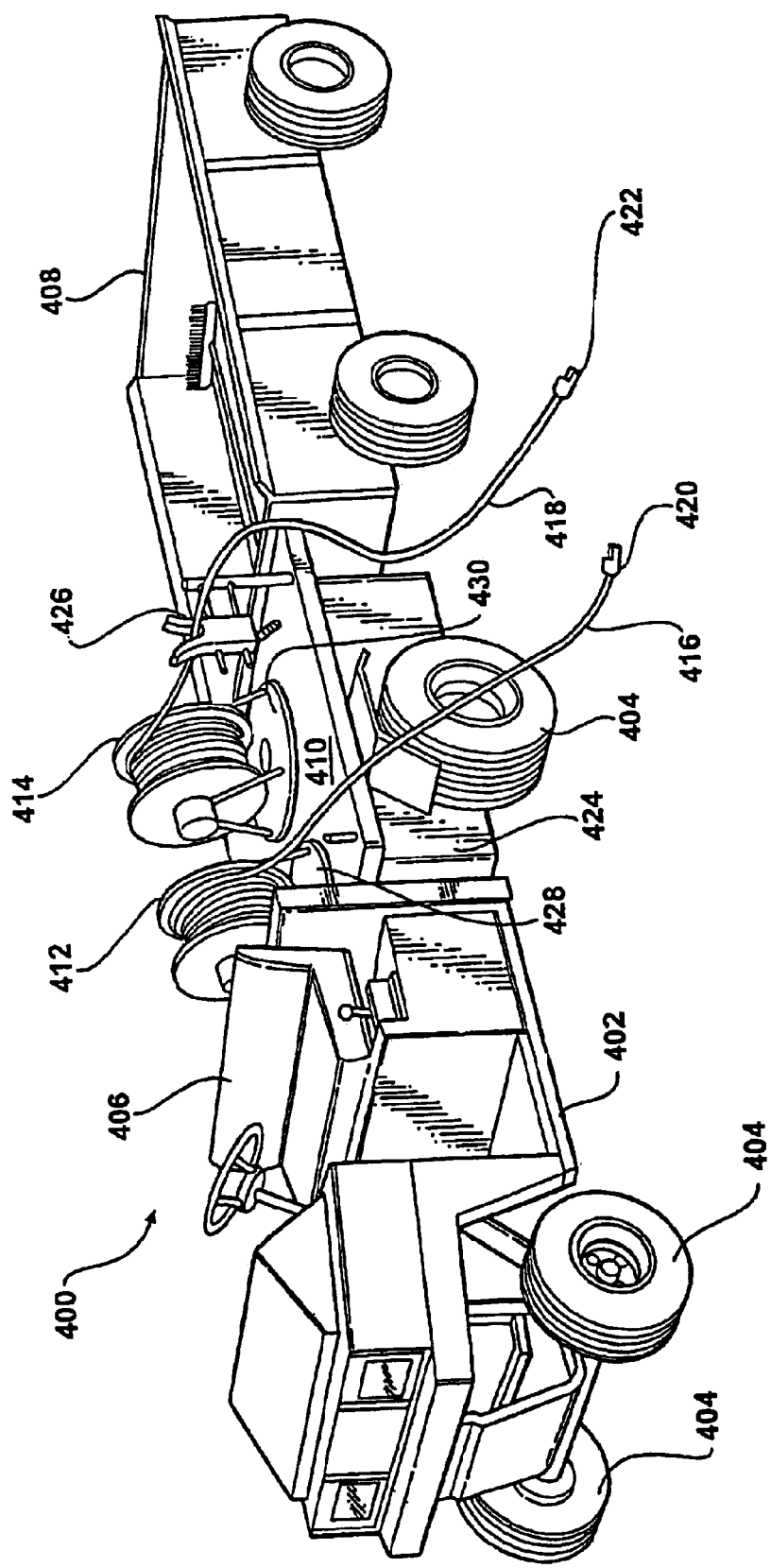
FIG. 16 shows a perspective view of an electrically powered machine receive electrical power from an electrical cable suspended from an extendible boom.

In yet another embodiment of the present invention, FIG. 16 depicts a multifunction work vehicle 400 for use in golf course maintenance. The work vehicle may be a general utility vehicle adapted for particular use for golf course maintenance. The work vehicle 400 includes a main unit 402 having four ground engaging wheels 404 and an operators station 406. The vehicle may also be adapted to include a towable trailer 408 for towing behind the main unit 402. Of particular relevance to this invention, the work vehicle 400 may also include a rear bed having mounted thereon two spools 412 and 414 for paying out electrical conductors 416 and 418, respectively. The electrical conductors 416 and 418 terminate at one end at connectors 420 and 422, respectively. The connectors 420 and 422 are adapted to attach to any of a number of electrically operated vehicles for performing golf course maintenance. Electrical storage batteries housed in a compartment 424 located beneath the rear bed 410 supply electrical energy for the two conductors 416 and 418. The spools 412 and 414 pay out the electrical conductors 416 and 418, respectively, in response to gentle tension. The spools 412 and 414 preferably also apply a slight retracting tension to facilitate winding the paid out electrical conductors back onto the spool. The rear bed 410 may also include a guide 426 through which the electrical conductor 418 passes. The guide 426 raises the electrical conductor 418 upwards and away from the vehicle to reduce chafe with the rear bed 410 and to facilitate winding and unwinding. Further, the spools 412 and 414 may be mounted on bases 428 and 430, respectively, which swivel so that as an electrically driven implement moves about the vehicle, the spools 412 and 414 can swivel about the bases 428 and 430, respectively, to facilitate unwinding and winding of the electrical conductors about the spools.

Figure 17:
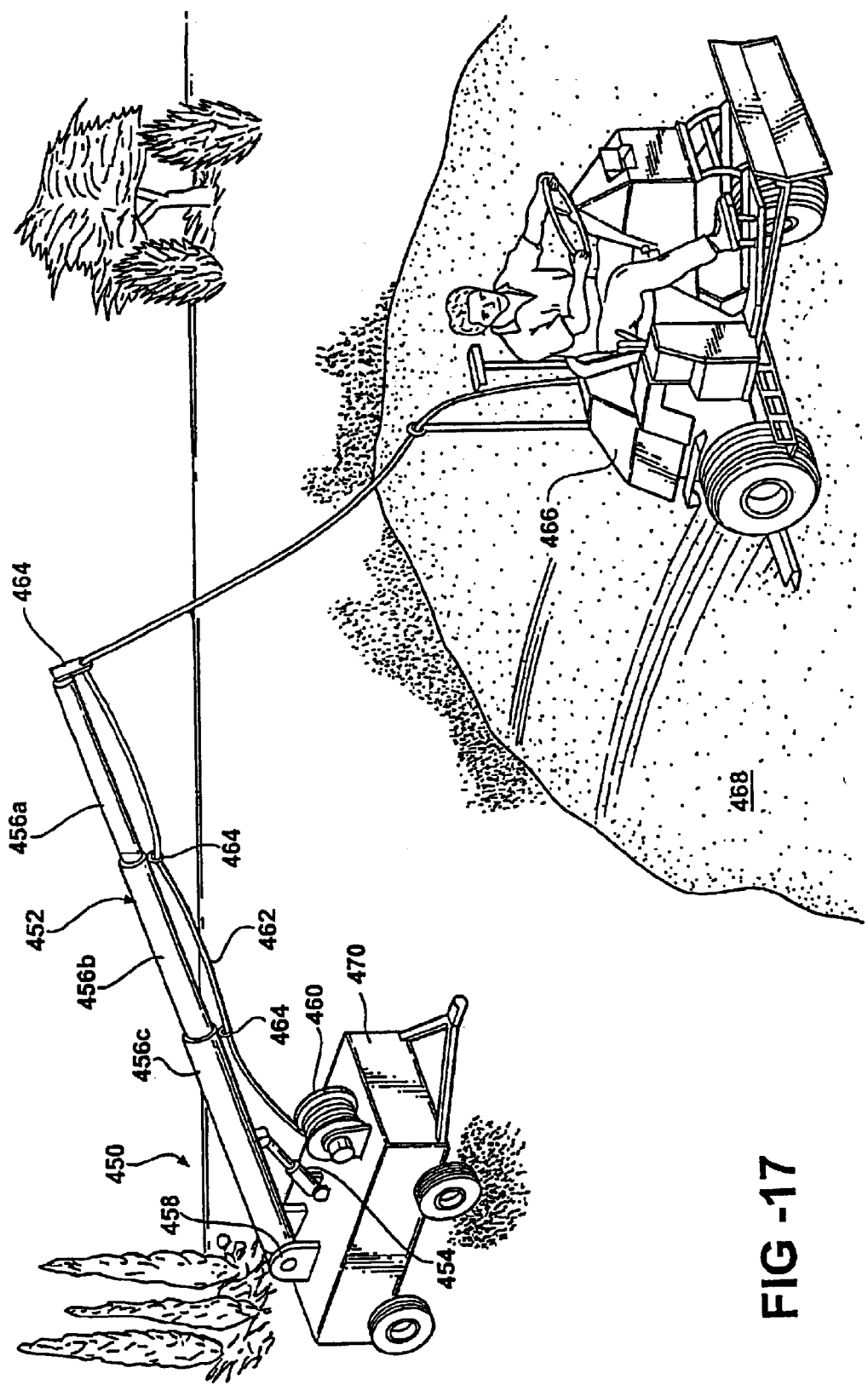
FIG. 17 shows a perspective view of a vehicle for supplying power to an electrically driven vehicle or implement where a retractable electrical cable wound around a spool provides the electrical power to the implement.

In yet another feature of the present invention, the embodiment of FIG. 16 results in the electrical conductors 416 and 418 generally being dragged over the terrain between the spools and the electrically driven implement. In some situations it is preferable that the electrical conductor not contract the terrain between the driven implement and the spool. FIG. 17 depicts one embodiment of an apparatus for preventing the electrical conductor from dragging on the ground. FIG. 17 depicts a boom trailer 450 having a extendable boom 452 extending therefrom in order to raise the electrical conductor and prevent contact with the ground. The boom trailer 450 includes an electric or hydraulic piston 454 for adjusting the boom angle. A plurality of sections 456a, 456b and 456c combine to form an extendable boom 452. Section 456a retracts within section 456b, and section 456b further retracts within section 456c. Section 455c is attached to the hydraulic piston 454 and pivots about hinge 458. A spool 460 provides a pay out and take up mechanism for electrical conductor 462. The electrical conductor 462 is routed through a series of rings 464 which maintain the cable in proximity to the boom 452 so that when the boom is elevated, the electrical conductor 462 does not contact the ground. As shown in FIG. 17, the electrical conductor provides electrical energy to a sand rake 466 for raking the sand trap 468. Thus, the sand rake 466 may be operated using electrical energy while the conductor 462 does not drag through the sand untidying the nicely raked appearance. Electrical energy supplying sand rake 466 through electrical conductor 462 is supplied by a plurality of storage batteries housed within a compartment 470 of boom trailer 450.

While boom trailer 450 is depicted as a towable trailer, it will be apparent to those skilled in the art that boom trailer 450 may be any of a number of mobile vehicles capable of transporting the storage batteries, the telescoping boom, and the spool of electrical conductor. For example, boom trailer 450 could also be an operator driven vehicle such as the utility vehicle depicted in FIG. 16. Further yet, it will be apparent to those skilled in the art that one or a number of the boom trailers could be transported in a multiple-vehicle towed arrangement and dispersed about the golf course in a manner similar to that described with respect to FIG. 15.

The foregoing detailed description shows that the preferred embodiments of the present invention are well suited to fulfill the objects above-stated. It is recognized that those skilled in the art may make various modifications or additions to the preferred embodiments chosen to illustrate the present invention without departing from the spirit and proper scope of the invention. For example, drive motors, reel motors, lift motors and steering motors of different voltages may be utilized, and the taps into the battery packs may be changed accordingly. Further, gear boxes may be used between the reels and reel motors if desired, and the number of batteries in the battery pack may be varied as needed.

While the present invention has been discussed with respect to riding mowers having a reel-type mowing heads, those skilled in the art will appreciate that it may be applied to electrically-powered riding mowers having multiple rotary mowing heads. In addition, the electrical control systems, generator set arrangements, and virtually all other aspects of the present invention may be used in connection with other turf care equipment used to tend large expanses of grass. For example, electrically-powered riding sprayers, aerators, dethatchers, and other equipment which would be beneficially operated in a pollution-free way with extremely low noise would benefit by the systems and structures of the present invention. In other words, except for the working tool being a mowing head, most such equipment can be readily adapted to utilize the various aspects of the present invention. Thus, the term "turf care machine" or "turf care equipment" if used in the claims below is to be understood to extend to all such forms of power-consuming equipment when arranged to be operated and/or driven using electrical motors and/or electrically-powered work-producing devices. Accordingly, it is to be understood that the protection sought and to be afforded hereby should be deemed to extend to the subject matter as defined by the appended claims, including all fair equivalents thereof.

What is claimed is:

1. A self-propelled riding mower comprising:
   a frame supported by a plurality of ground engaging wheels;
   a first electrical power source;
   a plurality of mowers supported by said frame, said mowers being moveable between a raised non-operative position and a lowered operative position, said mowers being driven by electric motors receiving electrical power from said first electrical power source;
   an electric motor supplied with electrical energy from said first electrical power source and adapted to provide driving torque to at least one of said ground engaging wheels;
   a second electrical power source, the second electrical power source not including a motor/generator set that charges the first electrical power source; and
   a trailer including a platform supported by a plurality of ground engaging wheels for carrying said second electrical power source behind said frame, said trailer interconnected to said frame by a hitch.

2. The self-propelled riding mower of claim 1, further comprising:
   an electrical connection arranged between said first electrical power source and a control circuit; and
   an electrical connection arranged between said second electrical power source and said control circuit.

3. The self-propelled riding mower of claim 1, further comprising;
   a support for said first electrical power source, said support engaging and disengaging said frame to facilitate removal and installation of at least a portion of said first electrical power source.

4. The self-propelled riding mower of claim 1, wherein said support includes a tray supporting said power source and a guide fixed to said frame, and wherein said tray engages said guide to align said tray and to facilitate removal and installation of said tray.

5. The self-propelled riding mower of claim 1, wherein said frame includes a friction reducing means disposed beneath said support such that said support engages said friction reducing means during installation onto and removal from said frame.

6. The self-propelled riding mower of claim 1, wherein said first electrical power source is embodied as a battery power source.

7. The self-propelled riding mower of claim 1, wherein said first electrical power source is embodied as a motor/generator set.

8. The self-propelled riding mower of claim 1 wherein said first electrical power source is embodied as one or more fuel cell.

9. The self-propelled riding mower of claim 1, wherein said second electrical power source is embodied as a battery power source.

10. The self-propelled riding mower of claim 1, wherein said second electrical power source is embodied as a motor/generator set.

11. The self-propelled riding mower of claim 1, wherein said second electrical power source is embodied as one or more fuel cell.

12. The self-propelled riding mower of claim 1, wherein said second electrical power source includes a battery power source and a motor/generator set.

13. The self-propelled riding mower of claim 12 wherein said motor/generator set and said battery power source are vertically arranged, one on top of the other.

* * * * *

UNITED STATES PATENT AND TRADEMARK OFFICE
CERTIFICATE OF CORRECTION

PATENT NO. : 6,938,400 B2
DATED : September 6, 2005
INVENTOR(S) : Alan R. Fillman et al.

It is certified that error appears in the above-identified patent and that said Letters Patent is hereby corrected as shown below:

Column 4,
Line 27, after "to" insert -- a --.
Line 66, "receive" should be -- reciving --.

Column 5,
Line 50, after "such" insert -- as --.

Column 6,
Line 40, "causes" should be -- causing --.

Column 9,
Line 42, "hinged" should be -- hinge --.

Column 11,
Line 42, "received" should be -- receive --.

Column 12,
Line 50, after "338" insert -- and --.

Column 13,
Line 17, delete "which".

Column 14,
Line 5, delete 2$^{nd}$ and 3$^{rd}$ occurrence of "A7 and A8" and substitute -- B7 and B8 and C7 and C8 --.
Line 35, "the" should be -- to --.

Column 15,
Line 64, "a" should be -- an --.

UNITED STATES PATENT AND TRADEMARK OFFICE
CERTIFICATE OF CORRECTION

PATENT NO.    : 6,938,400 B2
DATED         : September 6, 2005
INVENTOR(S)   : Alan R. Fillman et al.

It is certified that error appears in the above-identified patent and that said Letters Patent is hereby corrected as shown below:

Column 16,
Line 4, "section 455c" should be -- section 456c --.
Line 45, delete "a".

Signed and Sealed this

Twenty-eighth Day of February, 2006

JON W. DUDAS
*Director of the United States Patent and Trademark Office*